Jan. 1, 1935.  O. H. BANKER  1,985,884

CHANGE SPEED TRANSMISSION

Filed Dec. 14, 1932  4 Sheets-Sheet 2

Inventor
Oscar H. Banker
By Quarles & French
Attorneys

Jan. 1, 1935.  O. H. BANKER  1,985,884
CHANGE SPEED TRANSMISSION
Filed Dec. 14, 1932  4 Sheets-Sheet 3

Fig. 7

Inventor
Oscar H. Banker
Quarles & French
Attorneys

Patented Jan. 1, 1935

1,985,884

UNITED STATES PATENT OFFICE 1,985,884

CHANGE SPEED TRANSMISSION

Oscar H. Banker, Chicago, Ill., assignor to New Products Corporation, Chicago, Ill., a corporation of Delaware Application December 14, 1932, Serial No. 647,157

28 Claims. (Cl. 74—336.5)

The invention relates to change speed transmissions.

One of the objects of the invention is to provide an automatic change speed transmission wherein a single speed responsive mechanism acts to effect two different changes in speed.

A further object of the invention is to provide a full automatic three speed transmission having the change speed gears in constant mesh and mounted on shafts disposed in parallel relations to each other wherein change in speed from low to second and second to high is dependent upon a temporary deceleration of the drive shaft to allow it to synchronize with the driven shaft so that the transmission will stay in any gear to the full speed of the motor by the proper manipulation of the engine throttle.

A further object of the invention is to provide an automatic change speed transmission of the type above described which may be immediately shifted from high to second while proceeding in high gear at any speed and preferably through a control connected with the engine clutch control pedal and readily restored for automatic operation.

A further object of the invention is to provide an automatic change speed transmission of the type above described which may have adjustments permitting it to be maintained in high gear while the vehicle is traveling at a low speed and will also automatically change from high to second to low at successive reduction in speed.

A further object of the invention is to provide an automatic change speed transmission of the type above described which will go direct from low to high by a single deceleration of the engine at a low car speed.

A further object of the invention is to provide a change speed transmission of the type above described that can be positively locked in low or second gear when desired as for example when using the engine as a brake in going down hill.

A further object of the invention is to provide an automatic change speed transmission having in-mesh spiral gears, the thrust of these gears acting to engage and disengage clutches connecting one of the gears of each set to its shaft, the gears associated with these clutches being free when the transmission is in high gear or direct drive.

A further object of the invention is to provide a change speed transmission in which sets of constant mesh gears connect the drive and driven shafts for speed reduction, the first set of reduction gears providing the major part of the reduction ratio so that the speed of rotation of the drive gear of a second set of reduction gears relative to that of the drive shaft, when the transmission is in a higher or high gear ratio, is reduced to a substantial minimum so that said drive gear may rotate freely at a speed which is not much in excess of the drive shaft so as to permit said gear to function efficiently and noiselessly.

The invention further consists in the several features hereinafter set forth and more particularly defined by claims at the conclusion hereof.

In the drawings.

Fig. 7 is a side elevation view of the transmission, parts being broken away;

Referring to the drawings, the numeral 16 designates the engine shaft, 17 the flywheel secured to said shaft by the bolts 18, and 19 the transmission drive shaft.

The engine clutch may be of any suitable construction and for the purpose of illustration, I have shown a known form of clutch construction, the details of which form no part of the present invention, said clutch embodying a disk or plate element 20 having a hub 21 slidably splined on the shaft 19, a slidable pressure plate 22 associated with the usual pressure springs 23 (one being shown) and the release mechanism which includes the release collar 24 and the pivoted release lever 25 operatively connected to a bolt 26 connected to the pressure plate 22 so that when the collar 24 is moved toward the left by the operator, as hereinafter described, the pressure of the plate 22 through the springs 23 will be relieved from the plate element 20 and the engine will be disconnected from the transmission.

The shaft 19 is journalled on one end in a bushed bearing 29 in the engine shaft and at its other end portion in the ball bearing journal 30 whose outer race ring fits in a cage 31 mounted on the front end wall 32 of a casing 33, said shaft having a gear 34 formed thereon or secured thereto.

A driven shaft 35 is coaxially arranged relative to the shaft 19 and has one end 36 projecting in an axial bore 37 in the shaft 19 and journalled in roller bearings 38 mounted in said bore and its other end portion has a sleeve 39 splined thereto and journalled in a ball bearing 40 mounted in the rear wall of the casing 33.

A lay or stud shaft 41 is mounted in bearings 42 and 43 in the end walls of the casing and in parallel relation to the shafts 19 and 35 and has a gear 44 keyed thereto and meshing with the gear 34.

Spiral gears 45 and 46 are mounted on the shaft 35 and constantly mesh respectively with spiral gears 47 and 48 on the shaft 41, the gear 45 being of somewhat larger diameter than the gear 46 which in turn is somewhat larger in diameter than the gear 34.

With the above described gearing low speed is obtained by driving through gears 34 and 44 to shaft 41 and through the gears 47, 45 to the shaft 35; second speed by driving through gears 34 and 44 to the shaft 41 and through the gears 48 and 46 to the shaft 35; high speed by a direct drive connection between the shafts 19 and 35; and reverse through gears 34 and 44 to shaft 41 and through a gear 49 on shaft 41 meshing with a back gear 50 on a stud shaft 51 which gear is adapted to mesh with a gear 52 having a hub 53 slidably splined on the sleeve 39 and hence connected to the shaft 35. It is to be noted that the reduction ratio between the gears 34 and 44 comprises the major part of the reduction ratio of the gearing and that the reduction ratio between the gears 45, 47 and between the gears 46, 48 is small with the result that the speed of rotation of the gears 47 and 48 relative to the drive shaft will be low when the transmission is in its high gear ratio.

Figure 1:
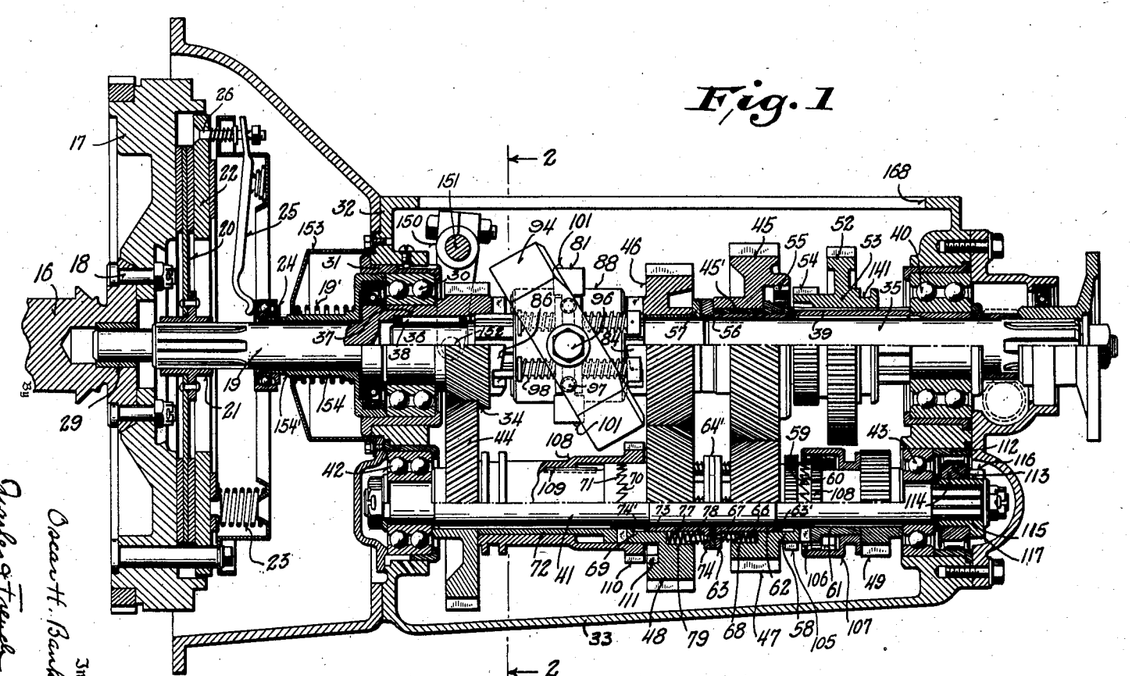
Fig. 1 is a central vertical sectional view through a transmission mechanism embodying the invention, parts of the interior mechanism being shown half in full and half in section.
Figures 2, 3, 5, 6:
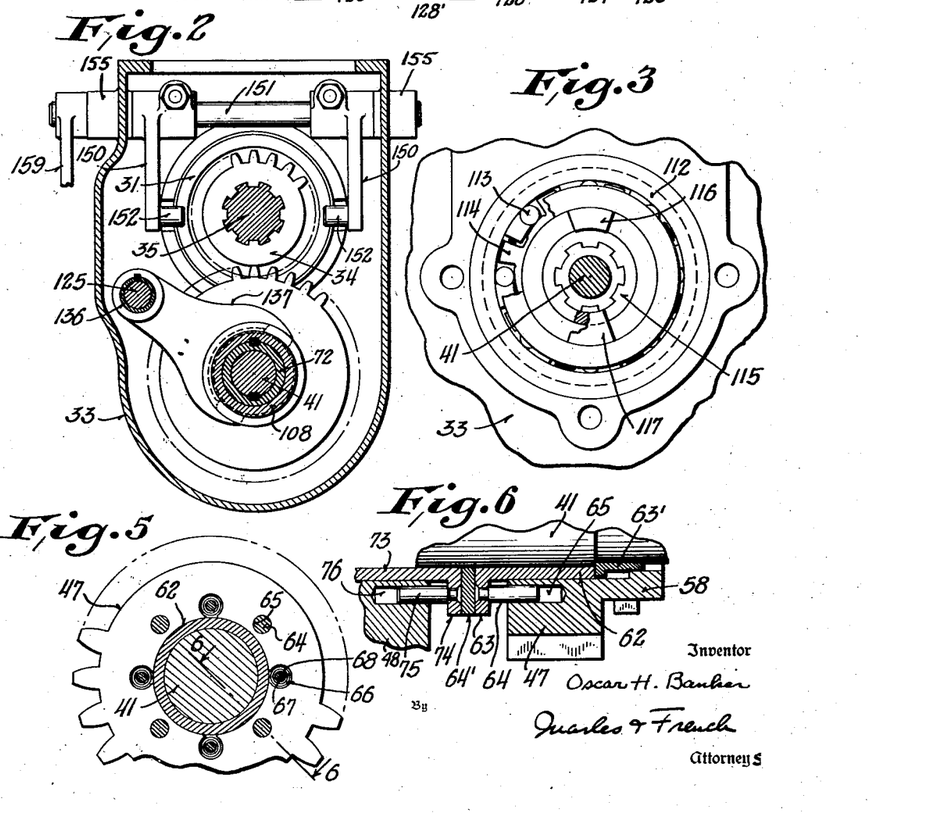
Fig. 2 is a transverse vertical sectional view taken on the line 2—2 of Fig. 1.
Fig. 3 is a detail end view of a portion of the device showing the automatic brake mechanism, parts being broken away and parts being shown in section and the cover removed.
Fig. 5 is a detail sectional view taken on the line 5—5 of Fig. 4.
Fig. 6 is a detail sectional view taken on the line 6—6 of Fig. 5.
Figure 4:
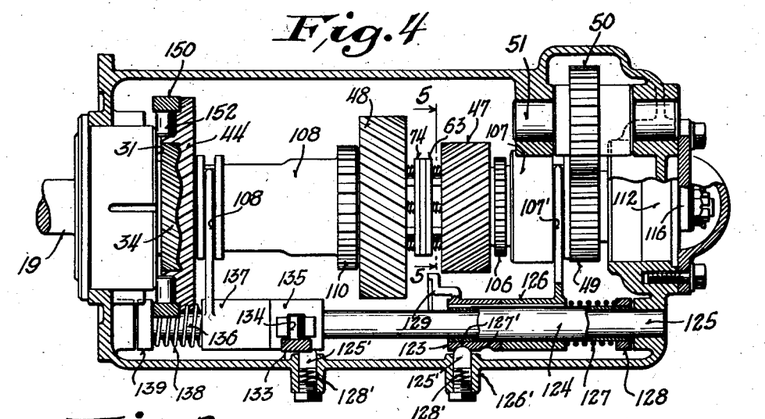
Fig. 4 is a horizontal sectional view through the transmission taken generally on the broken line 4—4 of Fig. 7, parts being shown in section and parts being broken away.

The hub portion 53 of gear 52 is provided with a clutch gear part 54 adapted to be moved into mesh with an annular clutch gear element 55, formed as a part of or secured to the gear 45, for forward drive and to be in the position shown in Fig. 1 for the neutral position and be shifted toward the right so that gear 52 meshes with the gear 50 for the reverse drive position of the transmission.

The gear 45 is provided with a bushing 45' that may turn freely on a flanged sleeve bushing 56 fast on the shaft 35 and the gear 46 has a flanged sleeve bushing 57 turning freely on the shaft 35.

The gear 47 has a sleeve extension 58 provided with a clutch jaw 59 adapted to mesh with a clutch jaw 60 formed on one end of a sleeve 61 keyed to the shaft 41. The hub of the gear 47 is mounted on a sleeve 62 provided with a flange 63. Pins 64 are mounted in this flange and project into openings 65 in the gear to center the gear relative to the sleeve. The gear 47 is normally urged to the position shown in Fig. 1 where the clutch jaws 59 and 60 engage by a plurality of springs 66 interposed between the flange 63 and said gear and surrounding pins 67, mounted on said flange and free to work in recesses 68 in the hub of said gear. It is also to be noted that the gear 47 may be moved toward the left against the action of springs 66 to disengage the jaw clutches 59 and 60.

The angles of the teeth of the spiral gears 45 and 47 are so designed that the thrust of these gears relative to each other is used to move the gear 47 to engage and disengage it from the sleeve 61 and hence the shaft 41. Thus when the gear 47 is the driver the thrust on said gear will act in conjunction with the springs 66 to bring the gear into clutched engagement with the sleeve 61 but when the gear 47 becomes the driven member then the thrust on said gear will act in the opposite direction and serve to move said gear to the left to completely disengage the clutch jaws 59 and 60.

The gear 48 has a sleeve extension 69 provided with a clutch jaw 70 adapted to mesh with a clutch jaw 71 formed on one end of a sleeve 72 keyed to the shaft 41. The hub of the gear 48 is mounted on a sleeve 73 provided with a flange 74. Pins 75 are mounted in this flange and project into openings 76 in the gear to center the gear relative to the sleeve. The gear 48 is normally urged to the position shown in Fig. 1 where the clutch jaws 70 and 71 are engaged by a plurality of springs 77 interposed between the flange 74 and said gear and surrounding pins 78, mounted on said flange and free to work in recesses 79 in the hub of said gear. It is also to be noted that the gear 48 may be moved toward the right against the action of the springs 77 to disengage the clutch jaws 70 and 71.

The angles of the teeth of the spiral gears 46 and 48 are so designed that the thrust of these gears relative to each other is used to move the gear 48 to engage and disengage it from the sleeve 72 and hence the shaft 41. Thus when the gear 48 is the driver the thrust on said gear will act in conjunction with the springs 77 to bring said gear into clutch engagement with the sleeve 72 but when the gear 48 becomes the driven member then the thrust on said gear will act in the opposite direction and serve to move said gear to the right to completely disengage the clutch jaws 70 and 71.

The flanges 63 and 74 abut against a thrust washer 64' interposed between them and the sleeves 62 and 73 while adapted to react through the washer 64' are limited in their longitudinal movement relative to the shaft 41 by the stop sleeves 63' and 74' on said shaft. The thrust of the flanges 63 and 74 on the washer 64' is preferably sufficient to create a drag on the sleeves 62 and 73 relative to the gears 47 and 48 so as to assist the thrusting action of the gears 45 and 46 upon said gears 47 and 48.

Figure 8:
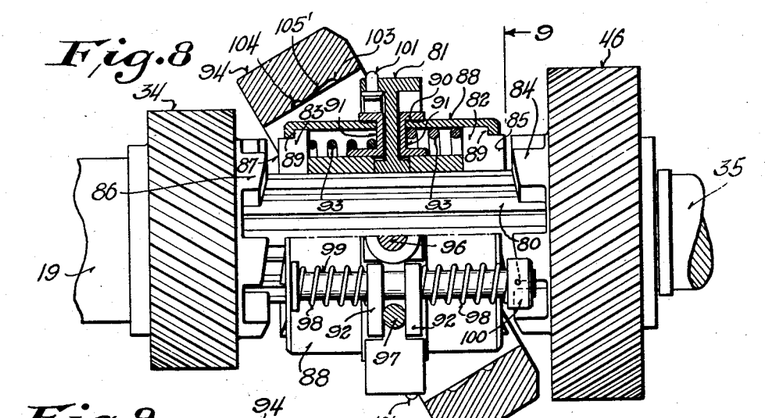
Fig. 8 is an enlarged detail elevation view through certain of the clutch mechanisms, parts of the operating means therefor being shown in section.
Figure 9:
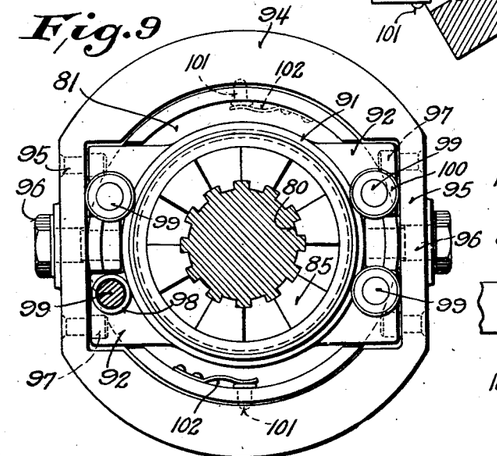
Fig. 9 is a detail vertical sectional view taken on the line 9—9 of Fig. 8.

The gear 46 is adapted to be connected to the shaft 35 to establish the second speed gear ratio by speed responsive clutch mechanism and the gear 34 is adapted to be connected to the shaft 35 to establish the direct drive by speed responsive clutch mechanism both of these clutch mechanisms in the preferred construction being operated by the same speed responsive device, shown in Fig. 1 and more in detail in Figs. 8 and 9.

The shaft 35 has a splined portion 80 upon which a supporting ring 81 is mounted and secured and upon which clutch members 82 and 83 are slidably splined. The gear 46 has a jaw clutch face 84 adapted to be engaged by the mating face 85 of the clutch member 82, the jaws being of the type having inclined faces so that they may slip past or overrun each other until conditions are right for engagement. The gear 34 has a jaw clutch face 86 adapted to be engaged by the mating face 87 of the clutch member 83, the jaws having inclined faces so that they may slip past or overrun each other until conditions are right for engagement.

A tubular member 88 surrounds each clutch element and has an inwardly extending flange engaging a shoulder 89 of said element and is anchored as by threads 90 to a disk 91 generally channel shaped in cross section but provided with laterally extending bosses 92, said disks 91 being mounted on opposite sides of the supporting ring 81. A coiled spring 93 is mounted between each disk 91 and its cooperative clutch element and acts as a yielding backing for the clutch element and as the means through which the clutch element is moved on the movement of the disk.

A speed responsive element 94 in the form of an annular member has side portions 95 pivotally mounted on trunnion pins or bolts 96 secured to the ring 81 and carries oppositely disposed pins 97 that are respectively adapted to engage the backs of the disks 91 and move the same as the element 94 swings from its inclined toward an upright position relative to the shaft 35. Movement of element 94 is normally restrained by springs 98 which are arranged in pairs surrounding rods 99 extending through the bosses 92, there being a spring between the head of each rod and one of the disks 91 and another spring between the other disk and a tension adjusting nut 100 on the rod. With this arrangement as the governor element 94 swings toward a position at right angles with the shaft 35, as the speed of said shaft increases, it acts in opposition to the springs 93 and through the pins 97 upon the disks 91 to move them apart and through them exerts pressure on the springs 93 which act on the clutch elements 82 and 83 and move them outwardly toward their cooperative clutch parts on the gears 46 and 34 and in overrunning relation therewith. Since the gear 46 is rotating slower than gear 34 the clutch faces 84 and 85 synchronize first upon a temporary deceleration of the engine by the closure of the engine throttle and hence engage and upon immediate acceleration of the shaft 19 the transmission is in second gear. Thereafter as the speed of the driven shaft 35 increases, the clutch faces 86 and 87 are overrunning each other until a second deceleration synchronizes them with each other which may be brought about by another temporary deceleration of the engine by the closing of the engine throttle and then on acceleration of the drive shaft 19 the transmission is in high gear. When the speed of the driven shaft 35 falls below a certain speed, for example seven miles per hour, the springs 99 and plungers 101 hereafter described are so set that the weight 94 tends to tilt back toward its original position but at this speed it is so arranged that the plunger 101 catches the weight 94 in its second notch 103 and holds it in that position. It is to be noted that clutch jaw 87 has a shorter travel for disengagement from jaw 86 than jaw 85 from jaw 84 whereby upon acceleration the clutch jaws 84 and 85 being still partially engaged the transmission is in second gear. Further reduction in speed of the vehicle to a car speed of five miles per hour would have caused weight 94 to assume its initial position and put the transmission in low.

To prevent hunting of the governor element oppositely disposed detents 101 mounted in the support 81 are urged outwardly by flat springs 102 and adapted to engage first in the locking recess 103 and then in the locking recess 104 as the governor reaches its final expanded condition. There are inclined surfaces 105' extending from the bottoms of the recesses 103 to the recesses 104 so that after the detents 101 are released from the recesses 104 they may be gradually moved relative to the member 94 to a position for engagement in the recesses 103 and under these conditions the speed responsive element will be held in partially expanded position until a definite lower speed is obtained.

With the above described arrangement, when the gear member 53 with its jaw clutch 54 is shifted toward the left to engage the jaw clutch 55 for forward drive and the engine clutch is engaged so that the shaft 19 is being driven by the engine, the drive proceeds from shaft 19 through gears 34 and 44 to shaft 41 and thence through gears 47 and 45 to shaft 35 with the vehicle in low gear and under these conditions the gear 48 is also rotating gear 46 but at a faster speed than the shaft 35. As the speed of the driven shaft 35 is increased the governor element 94 acts upon the clutches 82 and 83 moving them outwardly and when a certain predetermined speed is attained the clutch jaw 85 will be moved to a position to engage clutch jaw 84 when, by a temporary reduction in speed of the shaft 19, the speed of the driven gear 46 decreases and synchronizes with the speed of the driven shaft 35. During this reduction in speed of the shaft 19, the shaft 35 becomes the driver and gear 45 then acts to drive the gear 47 and thus exerts a shifting thrust upon the same to disengage the clutch parts 59 and 60 and the transmission is then in second gear with the drive proceeding from the shaft 41 through gears 48 and 46, clutch 84, 85 to shaft 35. As the speed of the driven shaft 35 increases the governor element 94 remains in fully expanded position since said element has attained this position as low as five miles per hour car speed and while keeping the clutch jaws 85 and 84 engaged and the clutch jaw 86 is overrunning the clutch jaw 87, actual clutched engagement of the jaws 86 and 87 taking place when by a temporary reduction in speed of the drive shaft 19 the speed of the gear 34 is reduced so that its speed will synchronize with that of the shaft 35. During this reduction in speed of the shaft 19, the shaft 35 becomes the driver and gear 46 then acts to drive the gear 48 and thus exerts a shifting thrust upon the same to disengage the clutch parts 70 and 71 and the transmission is then in high gear or direct drive with the gears 47 and 48 disconnected from the shaft 41 and the drive proceeding directly from shaft 19 through clutch 86, 87 to the driven shaft 35. Thus an automatic and progressive change in gear ratio from low to second and second to high may be effected. It is also to be noted that the tension of the springs 98 are preferably so adjusted that the governor elements 94 may bring the clutch elements to a position to effect the engagement of the high speed clutch 86, 87 when the vehicle is traveling at about three miles per hour. Also if the operator on his first deceleration of the shaft 19 as previously described waits for a longer period before accelerating the motor the direct drive connection may be effected substantially directly from low since the clutch parts 86 and 87 will then engage. It is also to be noted that the engine may be accelerated to its full speed in any of the ratios of the gear and that the speed responsive mechanism will not under these conditions change the established relation since the clutch engaging pressure is not increased with increase in speed.

When the vehicle is in high gear or direct drive, if for any reason it slows down to such a speed as to permit the springs 98 to act through the disks 91 upon the governor 94 to release it from the detents 101 then said governor may move to disconnect the clutch jaws 86 and 87 to establish the second speed ratio and upon a further reduction in speed of the shaft 35 said governor may act to disconnect the clutch jaws 84 and 85 to establish the low speed ratio. In the shifting back from high to second, the gear 46 no longer acts to drive the gear 48 and said gear is then shifted back under the action of the springs 77 to bring the clutch elements 70 and 71 into engagement. In the shifting back from second to low the gear 45 no longer acts to drive the gear 47 and said gear is then shifted back under the action of the springs 66 to bring the clutch elements 59 and 60 into engagement.

It is sometimes highly desirable in driving to change immediately from high to second and in order that the operator, with the present automatic shift, may not have to wait for a reduction in speed of the vehicle to effect this change, means have been provided under the control of the operator, for immediately placing the vehicle in second gear. For this purpose the shaft 19 with its bearing 30 and housing 31 is adapted to be shifted lengthwise so as to disconnect the clutch jaw 86 from the clutch jaw 87 when the governor 94 is in expanded position and regardless of the speed at which the vehicle is traveling and hence allow the vehicle to proceed immediately in second gear. Normally the spring 19' and the thrust due to the pitch of the teeth of the gear 34 hold the shaft 19 in the position shown in Fig. 1.

It is sometimes desirable to maintain the vehicle in second or in low gear to permit the engine to act as a brake when descending steep grades and in the present instance means under manual control have been provided for selectively locking the transmission in second or low gear ratio. For locking in low gear ratio the sleeve 58 has jaw clutch teeth 105 formed thereon adapted to engage the teeth of an internal jaw clutch 106 formed on a shiftable clutch element 107, the teeth of the clutch 106 also meshing with similar clutch teeth 108 formed on the clutch sleeve 61 and thus forming a splined connection therewith. Thus, when the clutch element 107 is shifted toward the left to bring the teeth of clutch 106 into mesh with the clutch teeth 105, the gear 47 will be locked to the shaft 41. It is also to be noted that the number of teeth of ratchet jaw 59, 60 is the same as jaw clutch teeth 105 and those of clutch 106 and that both sets of teeth of these clutches are alined with each other so that, when the ratchet jaw clutch is engaged, the positive lock jaw clutch may be engaged or disengaged without any interference with other parts. For locking in second gear ratio, a shiftable clutch element 108 is connected by a key 109 to the sleeve 72 and is in the form of a sleeve with a jaw clutch 110 at one end adapted to engage the jaw clutch teeth 111 formed as an internal clutch in one side of the gear 48. Thus when the sleeve 108 is shifted toward the right to bring the clutch 110 into mesh with the teeth 111 the gear 48 will be locked to the shaft 41. It is also to be noted that the number of teeth of the ratchet jaws 70, 71 is the same as those of jaw clutch 111 and the clutch 110 and that both sets of teeth of these clutches are alined with each other so that, when the ratchet jaw clutch is engaged, the positive jaw clutch may be engaged or disengaged without any interference with other parts.

When the vehicle is standing on a hill or is in a position where it may roll backwards when the transmission is in position for forward drive in order to prevent such backward movement I have provided an automatic one way brake for holding the shaft 41 against reverse rotation. This brake includes a drum 112 secured to the housing 33, rollers 113 engageable with the drum under the action of an actuator 114 having a lost motion connection with a sleeve 115 secured to the shaft 41. The lost motion connection is provided by a laterally extending lug 116 on the hub of the actuator which is adapted to be engaged by a radially disposed lug 117 on the sleeve 115 after a certain amount of relative angular movement of these parts. This is necessary to permit ready release for either forward or reverse conditions of the transmission since it provides enough lost motion to readily free the parts from the pressure of the locking rollers.

The control of the low speed locking clutch is through a Bowden wire 118 extending to any suitable point for operation and connected to the free end of a lever 119 mounted on a pivotally supported shaft 120 having a crank arm 121 provided with a pin end engaging in the slot 122 of a shifter member 123 in threaded engagement with one end of a sleeve 124 slidably mounted on a stud shaft 125 disposed in the transmission housing. A shifter fork 126 is mounted on the sleeve 124 and urged against the member 123 by a spring 127 interposed between said fork and a stop nut 128 on said sleeve. Thus the shifting of the member 123 also acts to shift the sleeve 124 and the fork 126 which engages in an annular groove 107' in the member 107 and if under these conditions the gear 47 is in the position shown in Fig. 1 and the fork 126 and the member 107 be shifted relative to the sleeve 124 the spring 127 will be compressed to a certain extent so that should the gear 47 be shifted toward the left the fork 126 and member 107 under the action of the spring 127 will follow it. Thus this arrangement provides a lost motion connection between the shiftable sleeve 124 and the shifter fork 126 and the clutch member 107. Furthermore, the shifter member 123 has a stop finger portion 129 adapted to cooperate with the gear 48 so as to prevent said gear 48 from being shifted toward the right from its position shown in Fig. 1 and out of mesh from its driving clutch jaws 70, 71 when the low gear positive clutch has been engaged and the shifter member 123 has been moved toward the left to bring the stop 129 into operative position to prevent the movement of the gear 48 to a released position. This will assure that, regardless of the acceleration or deceleration while driving, gear 46 will never synchronize with the driven shaft 35 to allow engagement of the clutch jaws 85, 84 which under the condition of being locked in "low" would wreck the transmission.

The control of the second speed locking clutch is through a Bowden wire 130 extending to any suitable point for operation and connected to the free end of a lever 131 mounted on a pivotally supported shaft 132 having a crank arm 133 provided with a pin end engaging in a slot 134 of a shifter member 135 in threaded engagement with one end of a sleeve 136 slidably mounted on a stud shaft 125. A shifter fork 137 is mounted on the sleeve 136, similar to the sleeve 124, and urged against the member 135 by a spring 138 interposed between said fork and a stop nut 139 on said sleeve. The fork 137 engages an annular groove 108' in the shiftable jaw clutch member 108. Thus the shifting of the member 135 also acts to shift the sleeve 136 and through the spring 138 acts to shift the fork 137 and the clutch member 108 and if under these conditions the gear 48 is in the position shown in Fig. 1 and the fork 137 and the member 108 is shifted relative to the sleeve 136, the spring 138 will be compressed to a certain extent so that should the gear 48 be shifted toward the right the fork 137 and member 108 under the action of the spring 138 will follow it so that the positive lock between the gear 48 and the shaft 41 is maintained. Thus this arrangement provides a lost motion connection between the shiftable sleeve 136 and the shifter fork 137 and the clutch member 108.

In connection with the above described clutches, since the gears 47 and 48 are shiftable, the jaw clutch members are also made to automatically shift with said gears during their reversals of torques and the overall length of these clutch parts is not increased even though the gears 47 and 48 with their clutch jaws 105 and 111 are shiftable. In each instance the shifter members 123 and 135 are held in a clutch retaining and release positions by a detent 125' mounted in an apertured boss 126' in the casing and urged into engagement with one of the recesses 127' in the member 123 or 135 by a spring 128'.

For shifting the member 53 to establish the forward, neutral and reverse positions of the transmission, a shifter fork 140 engages an annular groove 141 in said member 53 and has its hub slidably mounted on a guide shaft 142, the hub having a spring pressed detent 143 similar to the detent 125' and engageable in recesses 144 in said shaft 142 to hold said fork against accidental displacement. The hub 145 of said fork is slotted as at 146 for engagement with the pin end 147 of a lever 148 mounted on a rotatable control shaft 149 having an exterior lever arm 149' which may be operated in any suitable manner as by a connection with an engager on the dash as shown in my United States Letters Patent No. 1,843,195 dated February 2, 1932.

For shifting the shaft 19 to control the going into second from high and the release of the clutch, a forked member formed by the spaced arms 150, secured to the pivot shaft 151, has pin ends 152 adapted to engage against the inner end of the cage 31 which cage with the bearing 30 and shaft 19 are normally urged to the position shown in Fig. 1 by the spring 19' interposed between a fixed member 153 and a retainer part 154 for said bearing, said shaft 151 being pivotally mounted in pivot bosses 155 in the casing and receiving motion from a clutch pedal 156 pivoted at 157 and connected by a link 158 and lever 159 to the shaft 151, it being noted that a further movement of said pedal causes a shoulder 154' on the part 154 to engage the collar 24 and shift it forwardly thereby acting on the lever 25 and member 26 to release the pressure of the plate 22 on the disk 20 and thus release the engine clutch.

Figure 10:
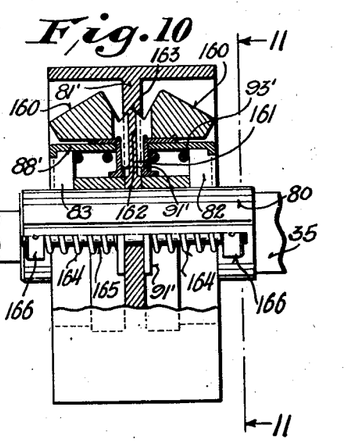
Fig. 10 is a view partly in half vertical section and partly in full with parts broken away of a modified form of clutch operating means.
Figure 11:
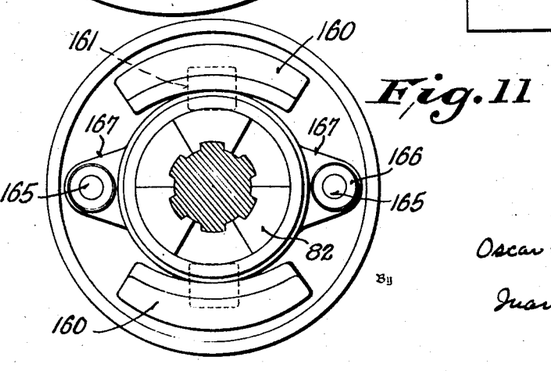
Fig. 11 is a detail sectional view taken on the line 11—11 of Fig. 10.

It has been previously noted that the single speed responsive element for operating both of the automatic clutches 85, 84 and 86, 87 is preferred but in Figs. 10 and 11 I have shown a modification of this mechanism wherein each clutch is operated by its own speed responsive device. Thus the clutch jaws 82 and 83 slidably splined on the splined part 80 of the shaft 35 are associated with sleeves 88', springs 93' and disks 91' in the same manner as the sleeves 88, springs 93 and disks 91 previously described and a flanged supporting member 81' is interposed between these two sets of clutches. Each clutch jaw is moved outwardly for engagement with its cooperative clutch member by a pair of oppositely disposed weights 160. Each of these weights has an arm portion 161 interposed between the back of the disk 91' and the member 81' in which it seats in a recess 162 whose upper end 163 serves as a fulcrum point about which the weight 160 can swing and in doing so exert pressure on the disk 91' and through the spring 93' upon the shiftable clutch member, the swinging movement of these weights being resisted by sets of springs 164 mounted on rods 165 and interposed between tension adjusting nuts 166 on the threaded ends of said rods and the lugs 167 on the disks 91'. The weights 160 act to move the clutch jaws 82 and 83 to an overrunning position with respect to clutch jaws 84 and 86 in the same manner as the single element 94 and engagement and disengagement of these clutches is effected in a similar manner to that of the preferred construction.

The general operation of the transmission and its control by the operator is very simple. With the vehicle at rest and the member 53 in a neutral position, the operator starts the engine in the usual manner in the present instance with the engine clutch 20, 22 disconnected. The member 53 may be shifted from neutral to forward position while the engine clutch is disconnected. Thereafter the clutch 20, 22 is allowed to engage and the shaft 19 is then driven direct from the engine. Under these conditions the operator may proceed from first to second automatically and from second to high as has been described in connection with the speed responsive clutch mechanism. If under conditions of driving while the operator is proceeding in high gear, he wishes to immediately proceed in second he pushes down on the clutch pedal 156 to some extent thereby shifting the shaft 19 forwardly to disconnect the clutch members 86, 87 directly connecting the drive shaft 19 and the driven shaft 35 and the vehicle then proceeds in second gear. If while driving down hill he wishes to use the engine as a brake he puts the vehicle in second as heretofore described and then he pulls on the wire 130 to respectively operate the second speed locking clutch 110, 111 so as to positively connect the gear 48 with the shaft 41. The locking in low gear by the mechanism previously described is accomplished by the pull on the wire 118 when the transmission is in low gear. His changing from high to second and second to low under ordinary conditions is brought about by the speed responsive mechanism as previously described. If he desires to reverse the vehicle he moves the member 53 to bring gear 52 into mesh with the gear 50 when the vehicle is standing still and then the engine clutch is engaged so that it is then connected to drive the transmission in reverse.

The casing 33 is provided with a large opening 168 in its top for giving ready access to the parts of the device and which is closed by a removable cover (not shown).

I desire it to be understood that this invention is not to be limited to any particular form or arrangement of parts except in so far as such limitations are included in the claims.

What I claim as my invention is:

1. In an automatic transmission, the combination of a drive shaft, a driven shaft, change speed gearing between said shafts for low and second speed gear ratios including sets of constant mesh spiral gears, one of the gears of some of the sets being freely shiftable, clutch mechanisms for said shiftable gears engaged and disengaged through the tooth reaction of said shiftable gears and their intermeshing gears, and speed responsive clutch mechanisms for respectively establishing the second speed gear ratio between said shafts through said gearing and direct connection between said shafts.

2. In an automatic transmission, the combination of a drive shaft, a driven shaft, change speed gearing between said shafts for low and second speed gear ratios including sets of constant mesh spiral gears, one of the gears of some of the sets being freely shiftable, clutch mechanisms for said shiftable gears engaged and disengaged through the tooth reaction of said shiftable gears and their intermeshing gears, clutch mechanisms for respectively establishing connection of said shafts through said gearing and direct connection between said shafts, and a single speed responsive means for actuating said last named clutch mechanisms.

3. In an automatic transmission, the combination of a drive shaft, a driven shaft, change speed gearing between said shafts, clutch mechanism for establishing connection of said shafts through said gearing, clutch mechanism for establishing direct drive connection between said shafts, speed responsive means for actuating said last named clutch mechanism, and manually operable means acting on said direct drive clutch connection to disconnect the same regardless of the speed of said shafts.

4. In an automatic transmission, the combination with a releasable engine clutch, a transmission drive shaft operably connected to said clutch, a driven shaft, automatically variable change speed mechanism for progressively changing the drive of the driven shaft from "low" to "high", a disconnectible clutch to immediately put said change speed mechanism in a lower gear ratio without reducing the speed of the driven shaft when in "high", said last named clutch being connected to said transmission drive shaft, said transmission drive shaft being shiftable to first disconnect said disconnectible clutch and thereafter release said engine clutch.

5. In an automatic transmission, the combination of a drive shaft, a driven shaft, change speed gearing between said shafts, speed responsive clutch mechanisms for respectively establishing connection of said shafts through said gearing and direct connection between said shafts, said clutch mechanisms being progressively operable to establish said connections upon a temporary reduction in speed of the drive shaft.

6. In a variable speed transmission, the combination of a drive shaft, a driven shaft, change speed gearing between said shafts for low and second speed gear ratios including sets of constant mesh spiral gears, one of the gears of some of the sets being shiftable, clutch mechanisms for said shiftable gears engaged and disengaged automatically through the tooth reaction of said shiftable gears and their intermeshing gears, and positive jaw clutch mechanisms for selectively connecting said shiftable gears in constant low or second speed gear ratio.

7. In an automatic transmission, the combination of a drive shaft, a driven shaft alined with said drive shaft, a lay shaft, in-mesh transmission gear sets between said lay shaft and said drive and driven shafts, disconnectible clutch connections for some of the gears on said lay shaft automatically operable when the driven shaft is the driver, speed responsive clutch mechanism for connecting one of said gear sets to the driven shaft for second speed, and speed responsive clutch mechanism for connecting said drive shaft directly with said driven shaft.

8. In a transmission mechanism, the combination of a drive shaft, a driven shaft, change speed reduction gearing between said shafts including sets of constant mesh gears, the first set of reduction gears providing the major part of the reduction ratio of the gearing to reduce the speed of rotation of the drive gear of the second set of reduction gears to a substantial minimum relative to that of said drive shaft when the transmission is in high gear ratio, and means for allowing said drive gear of the second set of reduction gears to rotate freely relative to its driver when the transmission is in high gear ratio.

9. In a transmission mechanism, the combination of a drive shaft, a driven shaft, a countershaft, change speed reduction gearing between said shafts including sets of constant mesh gears, means for connecting said drive and driven shafts together for direct drive, one of the gears of one of said gear sets being free to rotate on said countershaft when the transmission is connected for direct drive, and means for reducing the rate of rotation of said freely rotatable gear to a substantial minimum relative to that of said drive shaft when said gear is rotating freely.

10. In a change speed transmission, the combination of drive and driven shafts, driving and driven gears and cooperative clutches for establishing low, second and high gear ratios, said clutches having relatively movable clutch jaws and being of the overrunning type, means for automatically bringing the clutch jaws of said clutches into position for engagement, one of said clutches being engaged before the other to establish second gear ratio when the parts thereof are synchronized upon a deceleration of the drive shaft, the other of said clutches being engaged upon further deceleration of said drive shaft to establish the high gear ratio.

11. In a change speed transmission, the combination of a drive shaft, a driven shaft, change speed reduction gearing between said shafts, a jaw clutch of the overrunning type for connecting said shafts through said gearing, a jaw clutch of the overrunning type for connecting said shafts together for direct drive, each of said jaw clutches including a clutch jaw movable into engagement with a mating clutch jaw, means for bringing both of said movable clutch jaws into overrunning engagement with their mating jaws, one of said clutches being engaged for connecting said shafts through said gearing when the parts thereof are synchronized upon a deceleration of said drive shaft, the other of said clutches being engaged thereafter to establish direct drive upon a further deceleration of said drive shaft.

12. In a change speed transmission, the combination of a drive shaft, a driven shaft, change speed gearing between said shafts for establishing low and second gear ratios, jaw clutches of the overrunning type progressively operable for establishing said second gear ratio and a direct drive connection between said shafts, speed responsive means for actuating said jaw clutches, and automatically disconnectible clutches for certain of the gears of said gearing for permitting free rotation thereof when in second gear and direct drive.

13. In a variable speed transmission, the combination of a drive shaft, a driven shaft, change speed gearing between said shafts including a set of constant mesh spiral gears, one of the gears of said set being shiftable, clutch mechanism for said shiftable gear engaged and disengaged automatically through the tooth reaction of said shiftable gear and its intermeshing gear, and a positive jaw clutch mechanism for connecting said shiftable gear for fixed ratio drive through said gearing including a clutch jaw on said shiftable gear, and a manually shiftable clutch jaw shiftable with said shiftable gear.

14. In a variable speed transmission, the combination of a drive shaft, a driven shaft, change speed gearing between said shafts including a set of constant mesh spiral gears, one of the gears of said set being shiftable, clutch mechanism for said shiftable gear engaged and disengaged automatically through the tooth reaction of said shiftable gear and its intermeshing gear, a positive jaw clutch mechanism for connecting said shiftable gear for fixed ratio drive through said gearing including a clutch jaw on said shiftable gear and a shiftable clutch jaw, and a manually operated means for shifting said shiftable clutch jaw including an automatic take up connection permitting said shiftable clutch jaw to shift with said shiftable gear while maintaining its clutch connection therewith.

15. In an automatic transmission, the combination of a drive shaft, a driven shaft, change speed reduction gearing between said shafts, clutch mechanisms for connecting said shafts through said gearing, clutch mechanism for connecting said shafts together for direct drive, speed responsive means dependent upon the speed of the driven shaft for actuating said clutch mechanisms, and means for rendering said direct drive clutch mechanism inoperative to maintain its drive regardless of the speed of said shafts but maintaining the other speeds operative.

16. In a transmission mechanism, the combination of a drive shaft, a driven shaft alined with said drive shaft, a lay shaft, constant mesh gears constantly connecting said drive shaft with said lay shaft, a gear on said lay shaft, automatic clutch mechanism for connecting said gear to said lay shaft, a gear on said driven shaft meshing with said last named gear, clutch mechanism for connecting said gear on said driven shaft to said driven shaft, clutch mechanism for connecting said drive and driven shafts directly together, and speed responsive means for progressively operating said last named clutch mechanisms.

17. In an automatic transmission, the combination of a drive shaft, a driven shaft, change speed gearing between said shafts, clutch mechanism for establishing connection of said shafts through said gearing, clutch mechanism for establishing direct drive connection between said shafts, speed responsive means for actuating said last named clutch mechanism, said drive shaft being shiftable to disconnect said direct drive clutch connection regardless of the speed of said shafts while maintaining the other speeds operative, and manually operable means for shifting said drive shaft.

18. In an automatic transmission, the combination of a drive shaft, a driven shaft, change speed gearing between said shafts for low and second speed gear ratios including sets of constant mesh spiral gears, one of the gears of said sets being freely shiftable, clutch mechanisms for said shiftable gears engaged and disengaged through the tooth reaction of said shiftable gears and their intermeshing gears, and yieldable thrust connections between the gears to produce a drag on said gears to assist disengagement.

19. In an automatic transmission, the combination of a drive shaft, a driven shaft, change speed reduction gearing between said shafts including a pair of shiftable gears and disconnectible clutches for said gears to establish different speed ratios, means for locking one of said shiftable gears for fixed ratio drive through said gearing, control means for said locking means, and means actuated by said control means for stopping the shifting of the other shiftable gear.

20. In a change speed transmission, the combination of drive and driven shafts, driving and driven gears and cooperative clutches for establishing low, second and high gear ratios, certain of said clutches having relatively movable clutch jaws and being of the overrunning type, means for automatically bringing the clutch jaws of said clutches into position for engagement, one of said last named clutches adapted to establish the high speed ratio from low speed when the parts of the clutch for the high speed ratio are synchronized upon a deceleration of the drive shaft.

21. In a variable speed transmission, the combination of a drive shaft, a driven shaft, a countershaft, automatically variable change speed gearing between said shafts including sets of constant mesh gears, automatic clutch mechanism for certain of said constant mesh gears, one way clutch mechanism for one of the gears on said countershaft, and manually operable clutch mechanism for positively locking said one way clutched gear to maintain said gearing in constant ratio between said drive and driven shafts regardless of which shaft is the driver.

22. In a variable speed transmission, the combination of a drive shaft, a driven shaft, a countershaft, automatically variable change speed gearing between said shafts including sets of constant mesh gears, automatic clutch mechanism for certain of said constant mesh gears, one way clutch mechanisms for certain of the gears on said countershaft, and manually operable clutch mechanisms for positively locking said one way clutched gears to maintain said gearing in constant ratio between said drive and driven shafts regardless of which shaft is the driver.

23. In a change speed transmission, the combination of drive and driven shafts, driving and driven gears and cooperative clutches for establishing low, second and high gear ratios, said clutches having relatively movable clutch members, speed responsive means for actuating certain of said clutches, one of said last named clutches being engaged before the other to establish second gear ratio when the parts thereof are synchronized upon a deceleration of the drive shaft, the other of said last named clutches being engaged upon further deceleration of said drive shaft to establish the high gear ratio.

24. In a change speed transmission, the combination of a drive shaft, a driven shaft, change speed gearing between said shafts for establishing low and second gear ratios, jaw clutches of the overrunning type progressively operable for establishing said second gear ratio and a direct drive connection between said shafts, speed responsive means for bringing the clutch jaws of said clutches into position for engagement, one of said clutches being engaged before the other to establish second gear ratio when the parts thereof are synchronized upon a deceleration of the drive shaft, the other of said clutches being engaged upon further deceleration of said drive shaft to establish the high gear ratio, and means for freely rotating certain of the gears of said gearing when in second gear and in direct drive.

25. In a change speed transmission, the combination of a drive shaft, a driven shaft, change speed gearing between said shafts for establishing low and second gear ratios, jaw clutches of the overrunning type progressively operable for establishing said second gear ratio and a direct drive connection between said shafts, speed responsive means for bringing the clutch jaws of said clutches into position for engagement, one of said clutches being engaged before the other to establish second gear ratio when the parts thereof are synchronized upon a deceleration of the drive shaft, the other of said clutches being engaged upon further deceleration of said drive shaft to establish the high gear ratio, and automatically disconnectible clutches for certain of the gears of said gearing for permitting free rotation thereof when in second gear and in direct drive.

26. The combination of an engine clutch, means including a clutch pedal for controlling said clutch, a transmission drive shaft, a driven shaft, automatically variable change speed mechanism for progressively changing the drive of the driven shaft from "low" to "high" and means under the control of said clutch pedal to immediately put said change speed mechanism in a lower gear ratio without reducing the speed of the driven shaft when in "high".

27. The combination of an engine clutch, means including a clutch pedal for controlling said clutch, a transmission drive shaft, a driven shaft, automatically variable change speed mechanism for progressively changing the gear ratios between the drive and driven shafts from "low" to "second" to "high," and means under the control of said clutch pedal to immediately render said change speed mechanism ineffective to maintain said mechanism in "high" and put said mechanism in "second" without reducing the speed of the driven shaft when in "high".

28. In a change speed transmission, the combination of a drive shaft, a driven shaft, automatically variable change speed mechanism for progressively changing the gear ratios between the drive and driven shafts from "low" to "direct" drive, means to immediately render said change speed mechanism ineffective to maintain said mechanism in "direct" drive and put said mechanism in a lower gear ratio without reducing the speed of the driven shaft when in "direct" drive; said driven shaft adapted to be again connected in "direct" drive when the drive shaft is rotating in a lower gear ratio at a "high" speed and is synchronized with the speed of the driven shaft.

OSCAR H. BANKER.